(12) United States Patent
Araki et al.

(10) Patent No.: US 9,764,250 B2
(45) Date of Patent: Sep. 19, 2017

(54) FLUID PROCESSING METHOD INCLUDING EXTRACTION

(75) Inventors: Kaeko Araki, Izumi (JP); Daisuke Honda, Izumi (JP); Masakazu Enomura, Izumi (JP)

(73) Assignee: M. TECHNIQUE CO., LTD., Izumi-Shi, Osaka (JP)

( * ) Notice: Subject to any disclaimer, the term of this patent is extended or adjusted under 35 U.S.C. 154(b) by 676 days.

(21) Appl. No.: 14/125,030

(22) PCT Filed: May 23, 2012

(86) PCT No.: PCT/JP2012/063125
§ 371 (c)(1),
(2), (4) Date: Dec. 9, 2013

(87) PCT Pub. No.: WO2012/169351
PCT Pub. Date: Dec. 13, 2012

(65) Prior Publication Data
US 2014/0110336 A1    Apr. 24, 2014

(30) Foreign Application Priority Data

Jun. 10, 2011 (JP) .................................. 2011-130703

(51) Int. Cl.
*B01D 11/04* (2006.01)
*B01F 15/02* (2006.01)
*B01F 7/00* (2006.01)

(52) U.S. Cl.
CPC .......... *B01D 11/04* (2013.01); *B01D 11/0461* (2013.01); *B01D 11/0465* (2013.01);
(Continued)

(58) Field of Classification Search
CPC . B01D 11/04; B01D 11/0465; B01D 11/0461; B01D 11/0476; B01D 11/48;
(Continued)

(56) References Cited

U.S. PATENT DOCUMENTS

| | | | |
|---|---|---|---|
| 2008/0044357 A1 | 2/2008 | Wang et al. | |
| 2008/0159064 A1* | 7/2008 | Wang | B29B 7/407 366/145 |
| 2010/0155310 A1* | 6/2010 | Enomura | B01F 3/0807 209/668 |
| 2010/0319785 A1 | 12/2010 | Endmura | |

FOREIGN PATENT DOCUMENTS

CN    101076393 A    11/2007
CN    101784346 A    7/2010
(Continued)

*Primary Examiner* — Lucas Stelling
*Assistant Examiner* — Angel Olivera
(74) *Attorney, Agent, or Firm* — Birch, Stewart, Kolasch & Birch, LLP

(57) ABSTRACT

The problem addressed by the present invention is providing a fluid processing method including extraction that can extract material to be extracted continuously with high efficiency. In a thin film fluid formed between at least two processing surfaces (1, 2) disposed facing each other so as to be able to approach to and separate from each other such that at least one rotates relative to the other, a fluid processing that extracts at least one kind of material to be extracted in at least one kind of the extraction solvent that can extract that material to be extracted is carried out. In addition, the fluid containing at least one kind of material to be extracted and a fluid for extraction that contains the at least one kind of extraction solvent are mixed in the thin film fluid formed between the at least two processing surfaces (1, 2) disposed facing each other so as to be able to approach to and separate from each other such that at least one rotates relative to the other, and a fluid processing process that extracts the at least one kind of material to be extracted into the at least one kind of extraction solvent is carried out.

6 Claims, 4 Drawing Sheets

(52) U.S. Cl.
CPC ...... *B01F 7/00775* (2013.01); *B01F 7/00791* (2013.01); *B01F 15/0243* (2013.01); *B01D 11/048* (2013.01); *B01D 11/0476* (2013.01); *B01F 7/00758* (2013.01)

(58) Field of Classification Search
CPC ............ B01D 11/0457; B01D 11/0446; B01F 7/00775; B01F 15/0243; B01F 7/00791; B01F 7/00758; B01F 7/0075; C02F 1/42; C02F 1/52; C02F 1/5209; C02F 1/5236; C02F 1/5245; C02F 1/442; C02F 1/122; C02F 1/125; C02F 1/12; C02F 1/18; C02F 3/12; C02F 3/1215; C02F 2209/06; C02F 2305/02; C02F 2305/026; C02F 9/00; Y02W 10/15
See application file for complete search history.

(56) References Cited

FOREIGN PATENT DOCUMENTS

| | | |
|---|---|---|
| EP | 1829605 A1 | 9/2007 |
| JP | 8-291345 A | 11/1996 |
| JP | 10-263303 A | 10/1998 |
| JP | 2000-254406 A | 9/2000 |
| JP | 2004-49957 A | 2/2004 |
| JP | 2004-323947 A | 11/2004 |
| JP | 2006-341232 A | 12/2006 |
| JP | 2008-100149 A | 5/2008 |
| JP | 2008-522817 A | 7/2008 |
| JP | WO 2009/008394 A1 | 1/2009 |
| JP | 2011-68673 A | 4/2011 |
| WO | WO 2006/063516 A1 | 6/2006 |

* cited by examiner

FLUID PROCESSING METHOD INCLUDING EXTRACTION

The present invention relates to an extraction method for material to be extracted by using thin film fluid and a fluid processing method using the same.

Extraction is one of the typical treatments to separate and purify an intended material (hereinafter, material to be extracted). Method to extract a material to be extracted and apparatus for it generally take a batch system by using a separation funnel and so on in a laboratory. However, in a practical industrial scale using this batch system, there are problems of not only insufficient extraction but also extended processing time; and thus, many continuous extraction methods have been provided.

Apparatus and method for continuous extraction of a material to be extracted can be found, for example, in the Patent Documents 1 to 3; and various embodiments need to be used in accordance with the state of the material to be extracted (gaseous, liquid, or solid) as well as the conditions such as size, physical and chemical properties, and processing quantity thereof. For continuous extraction of metals such as rare metals including indium and precious metals such as platinum group metals, an apparatus such as a counter current continuous extraction apparatus as shown in the Patent Document 4 and a method such as a separation and recovery method using a supercritical phenomenon as shown in the Patent Document 5 may be mentioned.

However, when the extraction apparatus and extraction methods mentioned above are used in an industrial scale, these have not necessarily lead to reduction in energy and cost because they require expensive apparatus, extended processing time due to complicated extraction process, and so on.

Applicant of the present invention provided a fluid processing apparatus as well as a processing method for such treatments as reaction, synthesis, and separation by mixing and stirring fluids to be processed between at least two processing surfaces which are disposed in a position they are faced with each other so as to be able to approach to and separate from each other, at least one of which rotates relative to the other, as shown in the Patent Documents 6 and 7; but the extraction method to extract a material to be processed has not been disclosed therein. Therefore, the extraction method to readily extract a material to be extracted with high extraction efficiency (hereinafter high extraction yield) has been eagerly wanted.

PRIOR ART DOCUMENTS

Patent Document

Patent Document 1: Japanese Patent Laid-Open Publication No. 2000-254406
Patent Document 2: Japanese Patent Laid-Open Publication No. 2008-100149
Patent Document 3: Japanese Patent Laid-Open Publication No. 1998-263303
Patent Document 4: Japanese Patent Laid-Open Publication No. 2004-323947
Patent Document 5: Japanese Patent Laid-Open Publication No. 1996-291345
Patent Document 6: Japanese Patent Laid-Open Publication No. 2004-049957
Patent Document 7: International Patent Laid-Open Publication No. WO 2009/008394

DISCLOSURE OF THE INVENTION

Means for Solving the Problems

The present invention was made to solve the problems mentioned above and has an object to provide a fluid processing method including extraction that can extract a material to be extracted consistently with high efficiency. More preferably, the object thereof is to provide a fluid processing method including extraction that can extract a material to be extracted consistently with high yield.

Means for Solving the Problems

Inventors of the present invention carried out an extensive investigation; and as a result, they found that, when a fluid which contains a material to be extracted and a extracting fluid which contains an extraction solvent capable of extracting the said material to be extracted are mixed between at least two processing surfaces which are disposed in a position they are faced with each other so as to be able to approach to and separate from each other, at least one of which rotates relative to the other, the material to be extracted can be extracted into the extraction solvent efficiently and effectively; and based on this finding, they accomplished this invention.

The present invention provides a fluid processing method, wherein at least one kind of material to be extracted is extracted into at least one extraction solvent capable of extracting the said material to be extracted in a thin film fluid formed between at least two processing surfaces which are disposed in a position they are faced with each other so as to be able to approach to and separate from each other, at least one of which rotates relative to the other.

An embodiment of the present invention can be carried out as the fluid processing method, wherein the method uses at least two kinds of fluids as fluids to be processed:

of the at least one kind of fluid is a fluid which contains the at least one kind of material to be extracted and at least one kind of fluid other than the said fluid is an extracting fluid which contains the at least one kind of extraction solvent, wherein the fluid which contains the at least one kind of material to be extracted is mixed with the extracting fluid, the both fluids constituting the said fluids to be processed, in a thin film fluid formed between at least two processing surfaces which are disposed in a position they are faced with each other so as to be able to approach to and separate from each other, at least one of which rotates relative to the other, whereby extracting the material to be extracted into the extraction solvent.

Further, an embodiment of the present invention can be carried out as the fluid processing method, wherein any one of the fluids to be processed, the fluid which contains the at least one kind of material to be extracted and the extracting fluid, passes between the processing surfaces while forming the thin film fluid, a separate introduction path independent of a flow path through which the any one of the fluids to be processed passes is arranged, at least any one of the at least two processing surfaces is provided with at least one opening which leads to the introduction path, any other one of the fluids to be processed, the fluid which contains the at least one kind of material to be extracted and the extracting fluid, is introduced between the processing surfaces through the opening, whereby mixing the fluid which contains the at least one kind of material to be extracted with the extracting fluid in the thin film fluid, thereby extracting the material to be extracted into the extraction solvent.

Further, an embodiment of the present invention can be carried out as the fluid processing method, wherein the method comprises:

at least two processing members of a first processing member and a second processing member, the second processing member being capable of relatively approaching to and separating from the first processing member, and a rotation drive mechanism for rotating the first processing member and the second processing member relative to each other; wherein the at least two processing surfaces of a first processing surface and a second processing surface are disposed in a position where they are faced with each other in the first processing member and the second processing member, whereby processing the fluids to be processed in between the first processing surface and the second processing surface, wherein the fluids to be processed are passed between the first processing surface and the second processing surface which are disposed in a position they are faced with each other so as to be able to approach to and separate from each other, at least one of which rotates relative to the others, thereby extracting the material to be extracted into the extraction solvent by passing the fluids to be processed through between both the processing surfaces while forming the thin film fluid.

Further, an embodiment of the present invention can be carried out as the fluid processing method, wherein the method comprises:

Providing a fluid pressure imparting mechanism for imparting a pressure to the fluids to be processed, the first processing surface and the second processing surface constitute part of a forced flow path through which the fluids to be processed under the pressure is passed, of the first processing member and the second processing member, at least the second processing member is provided with a pressure-receiving surface, and at least part of the pressure-receiving surface is comprised of the second processing surface, this pressure-receiving surface receives a pressure applied to the fluids to be processed by the fluid pressure imparting mechanism thereby generating a force to move in the direction of separating the second processing surface from the first processing surface, any one of the fluids to be processed, the fluid which contains the at least one kind of material to be extracted and the extracting fluid, is introduced into between the first and second processing surfaces which are disposed in a position they are faced with each other so as to be able to approach to and separate from each other, at least one of which rotates relative to the others, at least one separate introduction path independent of a flow path through which the any one of the fluids to be processed passes is arranged, at least one opening which leads to the introduction path is provided to at least any one of the first and second processing surfaces, any other one of the fluids to be processed, the fluid which contains the at least one kind of material to be extracted and the extracting fluid, is introduced between both the processing surfaces through the opening, these fluids to be processed that are introduced into between both the processing surfaces pass through between both the processing surfaces while forming the thin film fluid, whereby mixing these fluids to be processed, thereby extracting the material to be extracted into the extraction solvent.

Further, an embodiment of the present invention can be carried out as the fluid processing method, wherein the method comprises:

a fluid pressure imparting mechanism for imparting a pressure to the fluids to be processed, the first processing surface and the second processing surface constitute part of a forced flow path through which the fluids to be processed under the pressure is passed, of the first processing member and the second processing member, at least the second processing member is provided with a pressure-receiving surface, and at least part of the pressure-receiving surface is comprised of the second processing surface, this pressure-receiving surface receives a pressure applied to the fluids to be processed by the fluid pressure imparting mechanism thereby generating a force to move in the direction of separating the second processing surface from the first processing surface, any one of the fluids to be processed, the fluid which contains the at least one kind of material to be extracted and the extracting fluid, is introduced into between the first and second processing surfaces which are disposed in a position they are faced with each other so as to be able to approach to and separate from each other, at least one of which rotates relative to the others, at least one separate introduction path independent of a flow path through which the any one of the fluids to be processed passes is arranged, at least one opening which leads to the introduction path is provided to at least any one of the first and second processing surfaces, any other one of the fluids to be processed, the fluid which contains the at least one kind of material to be extracted and the extracting fluid, is introduced between both the processing surfaces through the opening, these fluids to be processed that are introduced into between both the processing surfaces pass through between both the processing surfaces while forming the thin film fluid, whereby mixing and reacting these fluids to be processed, thereby extracting the material to be extracted into the extraction solvent.

Further, an embodiment of the present invention can be carried out as the fluid processing method, wherein at least three fluids to be processed, a first fluid, a second fluid, and a third fluid, are used, wherein of the first fluid and the second fluid, at least any one of the fluids contains the at least one kind of material to be extracted in the unreacted state, the third fluid is an extracting fluid which contains the at least one kind of extraction solvent capable of extracting the material to be extracted in the unreacted state or in the post-reaction state, wherein of the fluids to be processed, at least any one of the fluids to be processed passes through between both the processing surfaces while forming the thin film fluid, at least two separate introduction paths independent of a flow path through which the any one of the fluids to be processed passes is arranged, at least these two separate introduction paths are independent with each other, at least any one of the first processing surface and the second processing surface is provided with an opening which lead to each of the at least two separate introduction paths, the remaining fluids to be processed which are different from the at least one fluid is introduced into both the processing surfaces through the separate openings, the fluids to be processed are mixed in the thin film fluid to react the first fluid and the second fluid, whereby extracting at least any one of a reaction product and a by-product formed by the reaction into the extraction solvent as the material to be extracted.

Advantages

According to the present invention, the extraction treatment can be consistently carried out efficiently and effectively so that this process can be carried out more conveniently with less energy and lower cost than ever; and thus, a product that requires extraction in the industrial production can be provided cheaply and stably. In addition, according to the present invention, the yield (extraction efficiency) thereof can be readily controlled; and thus, an extracted product in accordance with its purpose can be provided. Further in addition, according to the present invention, the fluid processing including extraction can be carried out with further higher efficiency than ever because extraction treatment and the fluid processing such as reaction, separation, dissolution, and molecular dispersion can be carried out consistently.

Figure 1:
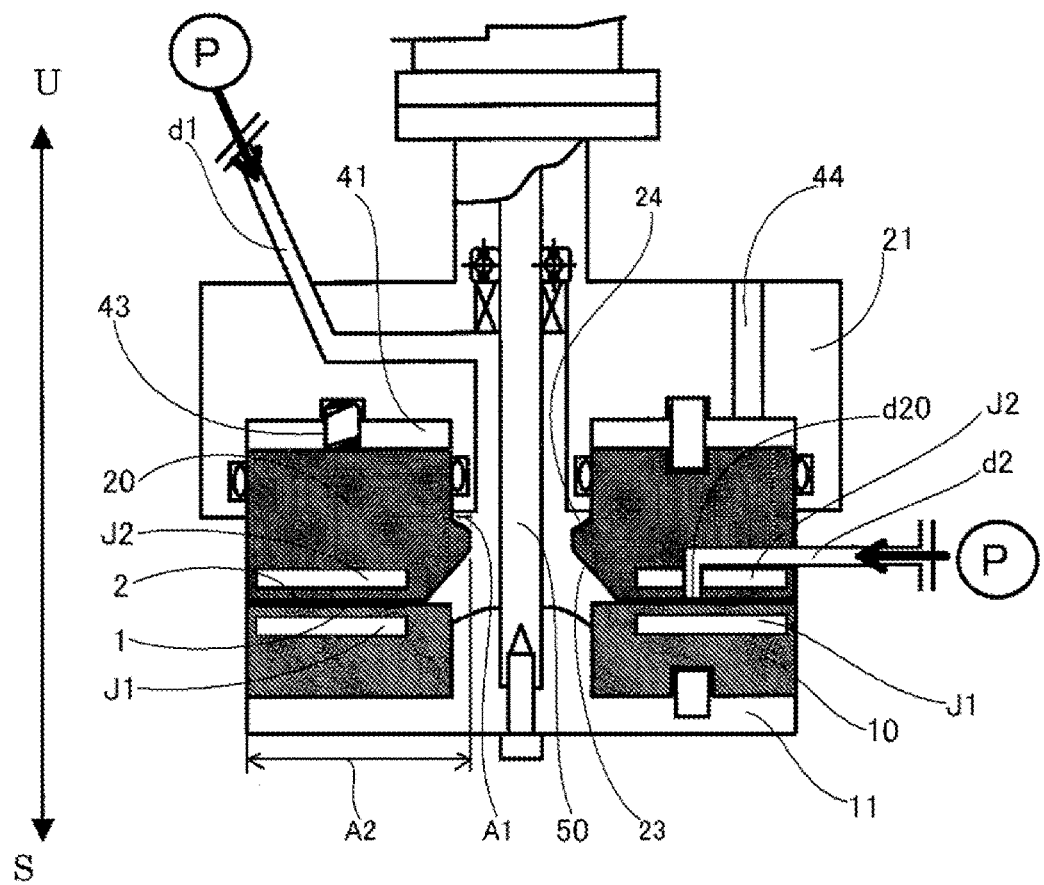
FIG. 1 is a schematic sectional view showing the fluid processing apparatus according to an embodiment of the present invention.

Hereinafter, detailed explanation of the present invention will be made; but a technical range of the present invention is not limited by the following Embodiments and Examples.

The material to be extracted in the present invention is not particularly restricted. Any material to be extracted in accordance with a purpose may be used. Illustrative example thereof includes a substance present in a nature (natural product) and an artificially synthesized organic substance, inorganic substance, and organic and inorganic composite substance. Illustrative example of the natural product includes, though not restricted, a living body such as an animal, a plant, and a microorganism; and a substance in a soil, a river, a sea, and so forth. More specifically, a protein, an amino acid, a carotene, a catechin, and so forth may be mentioned. In addition, a metal, a non-metal, a compound and an ion of them, and so forth may be mentioned. Illustrative example of the compound of a metal or a non-metal includes, though not particularly restricted, metal or non-metal compounds in the form of a salt, an oxide, a nitride, a carbide, a complex, an organic salt, an organic complex, an organic compound, and a hydrate and an organic solvent adduct of them.

In the present invention, the foregoing material to be extracted is used as a fluid in which at least one kind of material to be extracted that is mixed or dissolved in a gaseous or a liquid solvent as mentioned later is contained; here a fluid which contains at least one kind of material to be extracted is mixed with an extracting fluid to extract the said material to be extracted—this extracting fluid contains at least one kind of extraction solvent capable of extracting the material to be extracted—in between at least two processing surfaces which are disposed in a position they are faced with each other so as to be able to approach to and separate from each other, at least one of which rotates relative to the other; by so doing, the material to be extracted can be extracted into the extraction solvent.

The state of the material to be extracted in the fluid before and after the extraction treatment is not particularly restricted. The material to be extracted may be in the state of dissolution or molecular dispersion in a gaseous or a liquid solvent as mentioned later, or may be in the state of suspension such as the one in which microparticles in the state of a solid, an emulsion, and the like are dispersed in a solvent. In addition, reaction, separation, dissolution, molecular dispersion, and the like may accompany before and after the extraction treatment of the material to be extracted. Especially in the case that an intended compound (main product) or a by-product formed by the reaction decreases a reaction efficiency, this intended product can be obtained more efficiently and effectively than ever by consistently carrying out this reaction and the extraction of the intended compound (main product) or the by-product. In this case, the intended compound (main product) or the by-product is the material to be extracted.

For example, in the case that a metal ion is extracted, decrease of a partition coefficient can be made smaller by carrying out the treatment in a certain pH region. In the case that water is produced as the by-product in an equilibrium reaction of an organic reaction or an organic synthesis thereby retarding the reaction, the production reaction can be facilitated by removing the by-produced water to outside the system by extracting it with an aqueous solvent. In the present embodiment, the production reaction can be facilitated not only by removing the by-produced water to outside the system by extracting it with an aqueous solvent but also by removing the intended product (main product) to outside the system by extracting it with an organic solvent; and thus, at least any one of the intended product (main product) and the by-product may be extracted into the extraction solvent as the material to be extracted. The present invention is not limited to this embodiment; an intended material can be obtained efficiently and effectively by any combination of reaction and extraction. Meanwhile, the partition coefficient in the present invention means the ratio of amount of the at least one material to be extracted that is migrated into the extraction solvent to amount of the at least one kind of material to be extracted that is remained in the fluid which contains the at least one kind of material to be extracted after the extraction treatment.

The fluid which contains at least one kind of material to be extracted or the extracting fluid mentioned later may be in a gaseous or a liquid state, or in a super critical or a subcritical state.

The solvent that can be used in the fluid which contains the at least one kind of material to be extracted is not particularly restricted; and thus, for example, water, an organic solvent, or a mixed solvent comprising plurality of them may be mentioned. These solvents may be in a gaseous or a liquid state. Illustrative example of water includes a tap water, an ion-exchanged water, a pure water, a ultrapure water, and a RO water; illustrative example of the organic solvent includes an alcohol compound solvent, an amide compound solvent, a ketone compound solvent, an ether compound solvent, an organic phosphoric acid compound solvent, an aromatic compound solvent, a carbon disulfide solvent, an aliphatic compound solvent, a nitrile compound solvent, a sulfoxide compound solvent, a halogenated compound solvent, an ester compound solvent, an ionic liquid, a carboxylic acid compound, and a sulfonic acid compound. These solvents may be used singly or as a mixture of two or more of them.

Alternatively, it is also possible to mix or dissolve a basic substance or an acidic substance in the foregoing solvents for use. Illustrative example of the basic substance includes metal hydroxides such as sodium hydroxide and potassium hydroxide; carbonate salts such as sodium hydrogen carbonate and sodium carbonate; metal alkoxides such as sodium methoxide and sodium isopropoxide; amine compounds such as triethylamine, diethyl aminoethanol, and diethylamine; and ammonia. Illustrative example of the acidic substance includes inorganic acids such as an aqua regia, hydrochloric acid, nitric acid, fuming nitric acid, sulfuric acid, and fuming sulfuric acid; and organic acids such as formic acid, acetic acid, chloroacetic acid, dichloroacetic acid, oxalic acid, citric acid, ascorbic acid, phosphoric acid, trifluoroacetic acid, and trichloroacetic acid. These basic substances or acidic substances may be used as a mixture with the foregoing various solvents, or each of them may be used singly.

The extracting fluid to extract the material to be extracted by mixing thereof with the fluid which contains the at least one kind of material to be extracted shall contain at least one kind of extraction solvent that is capable of extracting the said material to be extracted. As to the said extraction solvent, the same solvent as the solvent that can be used in the fluid which contains the at least one kind of material to be extracted may be used. In accordance with the material to be extracted, the solvent used in the fluid which contains at least one kind of material to be extracted and the extraction solvent that is used in the extracting fluid may be used by appropriately selecting them.

In the present invention, as to the method and the apparatus with which the fluid which contains the at least one kind of material to be extracted may be uniformly stirred and mixed with the extracting fluid which contains the at least one kind of extraction solvent in a thin film fluid formed between at least two processing surfaces which are disposed in a position they are faced with each other so as to be able to approach to and separate from each other, at least one of which rotates relative to the other, it is preferable to use the apparatus based on the same principle as the apparatus shown in the Patent Document 6 or the Patent Document 7 filed by the present applicant. By using the apparatus based on the principle like this, the extraction treatment can be consistently carried out efficiently and effectively.

Hereinafter, embodiments of the above-mentioned fluid processing apparatus will be explained by using the drawings.

Figure 2:
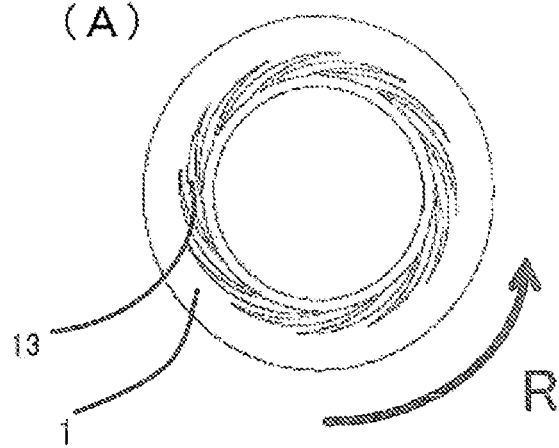
FIG. 2(A) is a schematic plane view of the first processing surface in the fluid processing apparatus shown in FIG. 1.
FIG. 2(B) is an enlarged view showing an important part of the processing surface in the apparatus.
Figure 2:
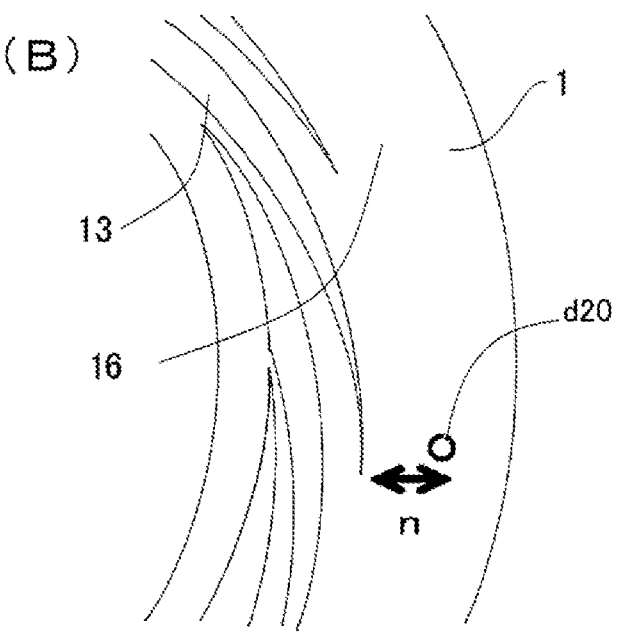
Figure 3:
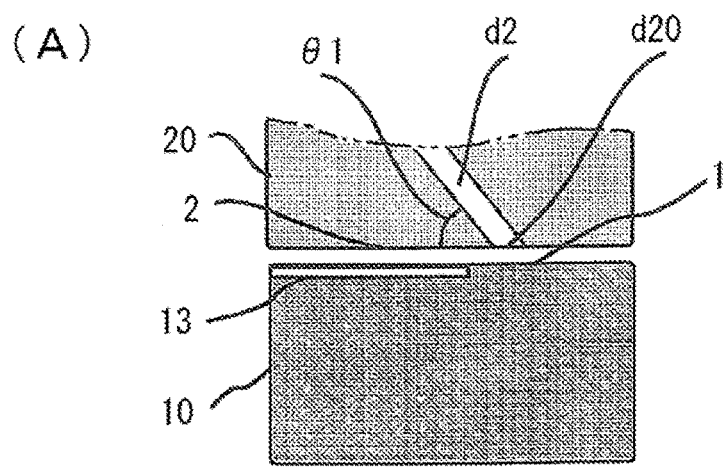
FIG. 3(A) is a sectional view of the second introduction member of the apparatus.
FIG. 3(B) is an enlarged view showing an important part of the processing surface for explaining the second introduction member.
Figure 3:
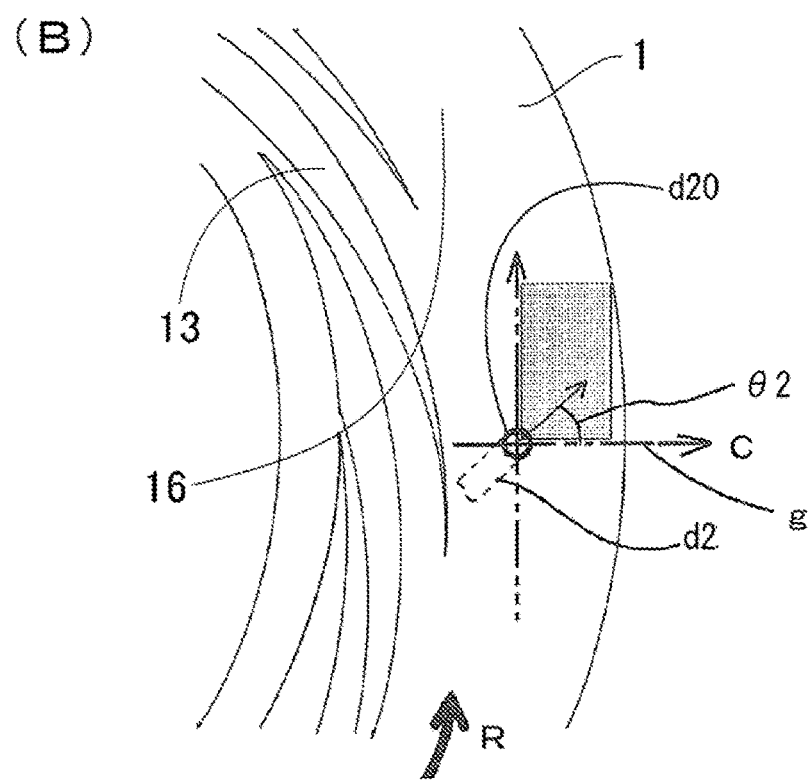

The fluid processing apparatus shown in FIG. 1 to FIG. 3 is similar to the apparatus described in Patent Document 3, with which a material to be processed is processed between processing surfaces in processing members arranged so as to be able to approach to and separate from each other, at least one of which rotates relative to the other; wherein, of the fluids to be processed, a first fluid to be processed, i.e., a first fluid, is introduced into between the processing surfaces, and a second fluid to be processed, i.e., a second fluid, is introduced into between the processing surfaces from a separate path that is independent of the flow path introducing the first fluid and has an opening leading to between the processing surfaces, whereby the first fluid and the second fluid are mixed and stirred between the processing surfaces. Meanwhile, in FIG. 1, a reference character U indicates an upside and a reference character S indicates a downside; however, up and down, front and back and right and left shown therein indicate merely a relative positional relationship and does not indicate an absolute position. In FIG. 2(A) and FIG. 3(B), reference character R indicates a rotational direction. In FIG. 3(C), reference character C indicates a direction of centrifugal force (a radial direction).

In this apparatus provided with processing surfaces arranged opposite to each other so as to be able to approach to and separate from each other, at least one of which rotates relative to the other, at least two kinds of fluids as fluids to be processed are used, wherein at least one fluid thereof contains at least one kind of material to be processed, a thin film fluid is formed by converging the respective fluids between these processing surfaces, and the material to be processed is processed in this thin film fluid. With this apparatus, a plurality of fluids to be processed may be processed as mentioned above; but a single fluid to be processed may be processed as well.

This fluid processing apparatus is provided with two processing members of a first processing member 10 and a second processing member 20 arranged opposite to each other, wherein at least one of these processing members rotates. The surfaces arranged opposite to each other of the respective processing members 10 and 20 are made to be the respective processing surfaces. The first processing member 10 is provided with a first processing surface 1 and the second processing member 20 is provided with a second processing surface 2.

The processing surfaces 1 and 2 are connected to a flow path of the fluid to be processed and constitute part of the flow path of the fluid to be processed. Distance between these processing surfaces 1 and 2 can be changed as appropriate; and thus, the distance thereof is controlled so as to form a minute space usually in the range of 1 mm or less, for example, 0.1 □m to 50 □m. With this, the fluid to be processed passing through between the processing surfaces 1 and 2 becomes a forced thin film fluid forced by the processing surfaces 1 and 2.

When a plurality of fluids to be processed are processed by using this apparatus, the apparatus is connected to a flow path of the first fluid to be processed whereby forming part of the flow path of the first fluid to be processed; and part of the flow path of the second fluid to be processed other than the first fluid to be processed is formed. In this apparatus, the two paths converge into one, and two fluids to be processed are mixed between the processing surfaces 1 and 2 so that the fluids may be processed by reaction and so on. It is noted here that the term "process(ing)" includes not only the embodiment wherein a material to be processed is reacted but also the embodiment wherein a material to be processed is only mixed or dispersed without accompanying reaction.

To specifically explain, this apparatus is provided with a first holder 11 for holding the first processing member 10, a second holder 21 for holding the second processing member 20, a surface-approaching pressure imparting mechanism, a rotation drive mechanism, a first introduction part d1, a second introduction part d2, and a fluid pressure imparting mechanism p.

As shown in FIG. 2(A), in this embodiment, the first processing member 10 is a circular body, specifically a disk with a ring form. Similarly, the second processing member 20 is a circular disk. Material of the processing members 10 and 20 is not only metal and carbon but also ceramics, sintered metal, abrasion-resistant steel, sapphire, and other metal subjected to hardening treatment, and rigid material subjected to lining, coating, or plating. In the processing members 10 and 20 of this embodiment, at least part of the first and the second surfaces 1 and 2 arranged opposite to each other is mirror-polished.

Roughness of this mirror polished surface is not particularly limited; but surface roughness Ra is preferably 0.01 µm to 1.0 µm, or more preferably 0.03 µm to 0.3 µm.

At least one of the holders can rotate relative to the other holder by a rotation drive mechanism such as an electric motor (not shown in drawings). A reference numeral 50 in FIG. 1 indicates a rotary shaft of the rotation drive mechanism; in this embodiment, the first holder 11 attached to this rotary shaft 50 rotates, and thereby the first processing member 10 attached to this first holder 11 rotates relative to the second processing member 20. As a matter of course, the second processing member 20 may be made to rotate, or the both may be made to rotate. Further in this embodiment, the first and second holders 11 and 21 may be fixed, while the first and second processing members 10 and 20 may be made to rotate relative to the first and second holders 11 and 21.

At least any one of the first processing member 10 and the second processing member 20 is able to approach to and separate from at least any other member, thereby the processing surfaces 1 and 2 are able to approach to and separate from each other.

In this embodiment, the second processing member 20 approaches to and separates from the first processing member 10, wherein the second processing member 20 is accepted in an accepting part 41 arranged in the second holder 21 so as to be able to rise and set. However, as opposed to the above, the first processing member 10 may approach to and separate from the second processing member 20, or both the processing members 10 and 20 may approach to and separate from each other.

This accepting part 41 is a concave portion for mainly accepting that side of the second processing member 20 opposite to the second processing surface 2, and this concave portion is a groove being formed into a circle, i.e., a ring when viewed in a plane. This accepting part 41 accepts the second processing member 20 with sufficient clearance so that the second processing member 20 may rotate. Meanwhile, the second processing member 20 may be arranged so as to be movable only parallel to the axial direction; alternatively, the second processing member 20 may be made movable, by making this clearance larger, relative to the accepting part 41 so as to make the center line of the processing member 20 inclined, namely unparallel, to the axial direction of the accepting part 41, or movable so as to depart the center line of the processing member 20 and the center line of the accepting part 41 toward the radius direction.

It is preferable that the second processing member 20 be accepted by a floating mechanism so as to be movable in the three dimensional direction, as described above.

The fluids to be processed are introduced into between the processing surfaces 1 and 2 from the first introduction part d1 and the second introduction part d2, the flow paths through which the fluids flow, under the state that pressure is applied thereto by a fluid pressure imparting mechanism p consisting of various pumps, potential energy, and so on. In this embodiment, the first introduction part d1 is a path arranged in the center of the circular, second holder 21, and one end thereof is introduced into between the processing surfaces 1 and 2 from inside the circular, processing members 10 and 20. Through the second introduction part d2, the first fluid to be processed and the second fluid to be processed for reaction are introduced into between the processing surfaces 1 and 2. In this embodiment, the second introduction part d2 is a path arranged inside the second processing member 20, and one end thereof is open at the second processing surface 2. The first fluid to be processed which is pressurized with the fluid pressure imparting mechanism p is introduced from the first introduction part d1 to the space inside the processing members 10 and 20 so as to pass through between the first and processing surfaces 1 and 2 to outside the processing members 10 and 20. From the second introduction part d2, the second fluid to be processed which is pressurized with the fluid pressure imparting mechanism p is provided into between the processing surfaces 1 and 2, whereat this fluid is converged with the first fluid to be processed, and there, various fluid processing such as mixing, stirring, emulsification, dispersion, reaction, deposition, crystallization, and separation are effected, and then the fluid thus processed is discharged from the processing surfaces 1 and 2 to outside the processing members 10 and 20. Meanwhile, an environment outside the processing members 10 and 20 may be made negative pressure by a vacuum pump.

The surface-approaching pressure imparting mechanism mentioned above supplies the processing members with force exerting in the direction of approaching the first processing surface 1 and the second processing surface 2 each other. In this embodiment, the surface-approaching pressure imparting mechanism is arranged in the second holder 21 and biases the second processing member 20 toward the first processing member 10.

The surface-approaching pressure imparting mechanism is a mechanism to generate force (hereinafter, surface-approaching pressure) to press the first processing surface 1 of the first processing member 10 and the second processing surface 2 of the second processing member 20 in the direction to make them approach to each other. The mechanism generates a thin film fluid having minute thickness in a level of nanometer or micrometer by the balance between the surface-approaching pressure and the force to separate the processing surfaces 1 and 2 from each other, i.e., the force such as the fluid pressure. In other words, the distance between the processing surfaces 1 and 2 is kept in a predetermined minute distance by the balance between these forces.

In the embodiment shown in FIG. 1, the surface-approaching pressure imparting mechanism is arranged between the accepting part 41 and the second processing member 20. Specifically, the surface-approaching pressure imparting mechanism is composed of a spring 43 to bias the second processing member 20 toward the first processing member 10 and a biasing-fluid introduction part 44 to introduce a biasing fluid such as air and oil, wherein the surface-approaching pressure is provided by the spring 43 and the fluid pressure of the biasing fluid. The surface-approaching pressure may be provided by any one of this spring 43 and the fluid pressure of this biasing fluid; and other forces such as magnetic force and gravitation may also be used. The second processing member 20 recedes from the first processing member 10 thereby making a minute space between the processing surfaces by separating force, caused by viscosity and the pressure of the fluid to be processed applied by the fluid pressure imparting mechanism p, against the bias of this surface-approaching pressure imparting mechanism. By this balance between the surface-approaching pressure and the separating force as mentioned above, the first processing surface 1 and the second processing surface 2 can be set with the precision of a micrometer level; and thus the minute space between the processing surfaces 1 and 2 may be set. The separating force mentioned above includes fluid pressure and viscosity of the fluid to be processed, centrifugal force by rotation of the processing members, negative pressure when negative pressure is applied to the biasing-fluid introduction part 44, and spring force when the spring 43 works as a pulling spring. This surface-approaching pressure imparting mechanism may be arranged also in the first processing member 10, in place of the second processing member 20, or in both the processing members.

To specifically explain the separation force, the second processing member 20 has the second processing surface 2 and a separation controlling surface 23 which is positioned inside the processing surface 2 (namely at the entering side of the fluid to be processed into between the first and second processing surfaces 1 and 2) and next to the second processing surface 2. In this embodiment, the separation controlling surface 23 is an inclined plane, but may be a horizontal plane. The pressure of the fluid to be processed acts to the separation controlling surface 23 to generate force directing to separate the second processing member 20 from the first processing member 10. Therefore, the second processing surface 2 and the separation controlling surface 23 constitute a pressure receiving surface to generate the separation force.

In the example shown in FIG. 1, an approach controlling surface 24 is formed in the second processing member 20. This approach controlling surface 24 is a plane opposite, in the axial direction, to the separation controlling surface 23 and, by action of pressure applied to the fluid to be processed, generates force of approaching the second processing member 20 toward the first processing member 10.

Meanwhile, the pressure of the fluid to be processed exerted on the second processing surface 2 and the separation controlling surface 23, i.e., the fluid pressure, is understood as force constituting an opening force in a mechanical seal. The ratio (area ratio A1/A2) of a projected area A1 of the approach controlling surface 24 projected on a virtual plane perpendicular to the direction of approaching and separating the processing surfaces 1 and 2, that is, in the direction of rising and setting of the second processing member 20 (axial direction in FIG. 1), to a total area A2 of the projected area of the second processing surface 2 of the second processing member 20 and the separation controlling surface 23 projected on the virtual plane is called as balance ratio K, which is important for control of the opening force. This opening force can be controlled by the pressure of the fluid to be processed, i.e., the fluid pressure, by changing the balance line, i.e., by changing the area A1 of the approach controlling surface 24.

Sliding surface actual surface pressure P, i.e., the fluid pressure out of the surface-approaching pressures, is calculated according to the following equation:

$$P = P1 \times (K-k) + Ps$$

Here, P1 represents the pressure of a fluid to be processed, i.e., the fluid pressure, K represents the balance ratio, k represents an opening force coefficient, and Ps represents a spring and back pressure.

By controlling this balance line to control the sliding surface actual surface pressure P, the space between the processing surfaces 1 and 2 is formed as a desired minute space, thereby forming a fluid film of the fluid to be processed so as to make the processed substance such as a product fine and to effect uniform processing by reaction.

Meanwhile, the approach controlling surface 24 may have a larger area than the separation controlling surface 23, though this is not shown in the drawing.

The fluid to be processed becomes a forced thin film fluid by the processing surfaces 1 and 2 that keep the minute space therebetween, whereby the fluid is forced to move out from the circular, processing surfaces 1 and 2. However, the first processing member 10 is rotating; and thus, the mixed fluid to be processed does not move linearly from inside the circular, processing surfaces 1 and 2 to outside thereof, but does move spirally from the inside to the outside thereof by a resultant vector acting on the fluid to be processed, the vector being composed of a moving vector toward the radius direction of the circle and a moving vector toward the circumferential direction.

Meanwhile, a rotary shaft 50 is not only limited to be placed vertically, but may also be placed horizontally, or at a slant. This is because the fluid to be processed is processed in a minute space between the processing surfaces 1 and 2 so that the influence of gravity can be substantially eliminated. In addition, this surface-approaching pressure imparting mechanism can function as a buffer mechanism of micro-vibration and rotation alignment by concurrent use of the foregoing floating mechanism with which the second processing member 20 may be held displaceably.

In the first and second processing members 10 and 20, the temperature thereof may be controlled by cooling or heating at least any one of them; in FIG. 1, an embodiment having temperature regulating mechanisms J1 and J2 in the first and second processing members 10 and 20 is shown. Alternatively, the temperature may be regulated by cooling or heating the introducing fluid to be processed. These temperatures may be used to separate the processed material or may be set so as to generate Benard convection or Marangoni convection in the fluid to be processed between the first and second processing surfaces 1 and 2.

As shown in FIG. 2, in the first processing surface 1 of the first processing member 10, a groove-like depression 13 extended toward an outer side from the central part of the first processing member 10, namely in a radius direction, may be formed. The depression 13 may be, as a plane view, curved or spirally extended on the first processing surface 1 as shown in FIG. 2(B), or, though not shown in the drawing, may be extended straight radially, or bent at a right angle, or jogged; and the concave portion may be continuous, intermittent, or branched. In addition, this depression 13 may be formed also on the second processing surface 2, or on both the first and second processing surfaces 1 and 2. By forming the depression 13 as mentioned above, the micro-pump effect can be obtained so that the fluid to be processed may be sucked into between the first and second processing surfaces 1 and 2.

It is preferable that the base edge of this depression 13 reach the inner periphery of the first processing member 10. The front edge of the depression 13 is extended to the direction of the outer periphery of the first processing surface 1; the depth thereof (cross section area) is made gradually shallower (smaller) from the base edge to the front edge.

Between the front edge of the depression 13 and the outer peripheral of the first processing surface 1 is formed the flat plane 16 not having the depression 13.

When an opening d20 of the second introduction part d2 is arranged in the second processing surface 2, the arrangement is done preferably at a position opposite to the flat surface 16 of the first processing surface 1 arranged at a position opposite thereto.

This opening d20 is arranged preferably in the downstream (outside in this case) of the depression 13 of the first processing surface 1. The opening is arranged especially preferably at a position opposite to the flat surface 16 located nearer to the outer diameter than a position where the direction of flow upon introduction by the micro-pump effect is changed to the direction of a spiral and laminar flow formed between the processing surfaces. Specifically, in FIG. 2(B), a distance n from the outermost side of the depression 13 arranged in the first processing surface 1 in the radial direction is preferably about 0.5 mm or more. Especially in the case of separating microparticles from a fluid, it is preferable that mixing of a plurality of fluids to be processed and separation of the microparticles therefrom be effected under the condition of a laminar flow. Shape of the opening part d20 may be circular as shown in FIG. 2(B) and FIG. 3(B), or a concentric circular ring shape which encloses the central opening of the processing surface 2 having a form of a ring-like disk, though not shown. In the case that the opening part is made in the circular ring shape, the opening part having the circular ring shape may be continuous or discontinuous.

This second introduction part d2 may have directionality. For example, as shown in FIG. 3(A), the direction of introduction from the opening d20 of the second processing surface 2 is inclined at a predetermined elevation angle ($\theta1$) relative to the second processing surface 2. The elevation angle ($\theta1$) is set at more than 0° and less than 90°, and when the reaction speed is high, the angle ($\theta1$) is preferably set in the range of 1° to 45°.

In addition, as shown in FIG. 3(B), introduction from the opening d20 of the second processing surface 2 has directionality in a plane along the second processing surface 2. The direction of introduction of this second fluid is in the outward direction departing from the center in a radial component of the processing surface and in the forward direction in a rotation component of the fluid between the rotating processing surfaces. In other words, a predetermined angle ($\theta2$) exists facing the rotation direction R from a reference line g, which is the line to the outward direction and in the radial direction passing through the opening d20. This angle ($\theta2$) is also set preferably at more than 0° and less than 90°.

This angle ($\theta2$) can vary depending on various conditions such as the type of fluid, the reaction speed, viscosity, and the rotation speed of the processing surface. In addition, it is also possible not to give the directionality to the second introduction part d2 at all.

In the embodiment shown in FIG. 1, kinds of the fluid to be processed and numbers of the flow path thereof are set two respectively; but they may be one, or three or more. In the embodiment shown in FIG. 1, the second fluid is introduced into between the processing surfaces 1 and 2 from the introduction part d2; but this introduction part may be arranged in the first processing member 10 or in both. Alternatively, a plurality of introduction parts may be arranged relative to one fluid to be processed. The opening for introduction arranged in each processing member is not particularly restricted in its form, size, and number; and these may be changed as appropriate. The opening for introduction may be arranged just before the first and second processing surfaces 1 and 2 or in the side of further upstream thereof.

Hereunder, specific embodiments as to the fluid processing method including extraction by using the above-mentioned apparatus will be explained.

In the apparatus mentioned above, as the fluids to be processed, the extracting fluid which contains at least one kind of extraction solvent and the fluid which contains at least one kind of material to be extracted are mixed in a thin film fluid (in a forced thin film) formed between the processing surfaces 1 and 2 which are disposed in a position they are faced with each other so as to be able to approach to and separate from each other, at least one of which rotates relative to the other; by so doing, the material to be extracted is extracted into the extraction solvent.

The extraction to the material to be extracted takes place in the apparatus as shown in FIG. 1 of the present application while the fluids are being mixed forcibly and uniformly between the processing surfaces 1 and 2 which are disposed in a position they are faced with each other so as to be able to approach to and separate from each other, at least one of which rotates relative to the other.

At first, the extraction fluid in which at least one extraction solvent is contained is introduced as the first fluid from the first introduction part d1, which is one flow path, into between the processing surfaces 1 and 2 which are disposed in a position they are faced with each other so as to be able to approach to and separate from each other, at least one of which rotates relative to the other, thereby forming between the processing surfaces 1 and 2 a first fluid film which is a thin film fluid formed of the first fluid.

Then, the fluid in which contains at least one material to be extracted is introduced as the second fluid directly into the first fluid film formed between the processing surfaces 1 and 2 from the second introduction part d2 which is another flow path.

By so doing, the first fluid and the second fluid are mixed between the processing surfaces 1 and 2 while the distance therebetween is fixed by pressure balance between the supply pressure of the fluids to be processed and the pressure that is applied between the rotating processing surfaces, thereby extracting.

By mixing the first fluid and the second fluid in a thinned film formed between the processing surfaces 1 and 2 in which the distance between the processing surfaces 1 and 2 and the mixing condition of the fluids to be processed are stabilized, surface areas of the respective fluids are increased, so that any one of mixing and diffusion thereof or both can be facilitated. Accordingly, instantaneous extraction of the material to be extracted becomes possible, so that the material to be extracted can be extracted into the extraction solvent in high yield (high extraction efficiency). In addition, in the case that a plurality of materials to be extracted are extracted in between the processing surfaces 1 and 2, each of the plurality of materials to be extracted can be extracted into the extraction solvent, and in addition, the extraction ratio of the plurality of materials to be extracted can be made stable.

Meanwhile, because it is good enough only if the extraction could be effected between the processing surfaces 1 and 2, as opposed to the foregoing method, a method wherein the second fluid is introduced from the first introduction part d1 and a solution containing the first fluid is introduced from the second introduction part d2 may also be used. That is, the expression "first" or "second" for each fluid has a meaning for merely discriminating an $n^{th}$ fluid among a plurality of the fluids present; and therefore, a third or more fluids can also exist.

Figure 4:
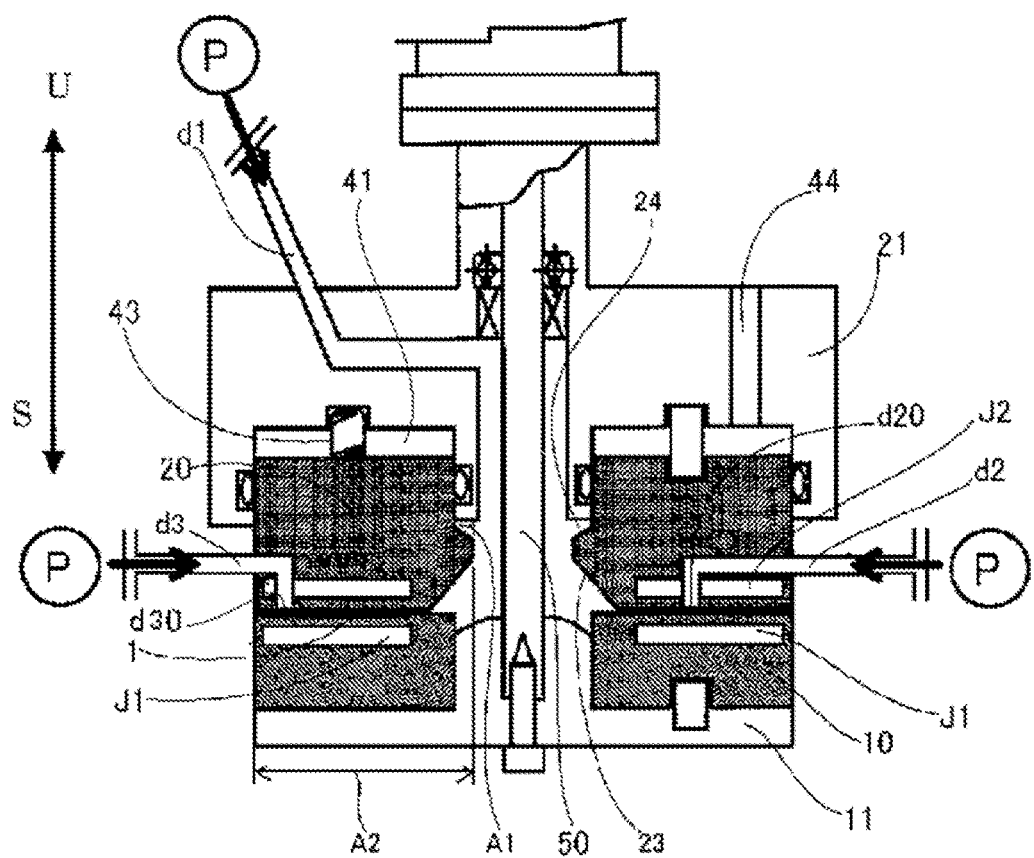
FIG. 4 is a schematic sectional view showing the apparatus according to other embodiment of the present invention.

Alternatively, as mentioned before, the processing apparatus may be provided with, in addition to the first introduction part d1 and the second introduction part d2, the third introduction part d3 which has the opening d30 in the second processing surface 2, as shown in FIG. 4; and in this case, for example, from the respective introduction parts, the extracting fluid which contains at least one extraction solvent as the first fluid, the fluid which contains at least one kind of material to be extracted as the second fluid, and the extracting fluid which contains at least one extraction solvent that is different from the first fluid as the third fluid may be introduced separately into the processing apparatus. By so doing, concentration and pressure of each fluid can be controlled separately so that change of the partition coefficient, fine tuning thereof, and the like in the extraction treatment may be controlled more stably and precisely. Meanwhile, the location of the opening d30 of the third introduction part d3 is arbitrary. A combination of the fluids to be processed (first to third fluids) that are introduced into each of the introduction parts may be set arbitrarily. The same is applied if the fourth or more introduction parts are arranged; and by so doing, fluids to be introduced into the processing apparatus may be subdivided.

Temperatures of the fluids to be processed such as the first fluid and the second fluid may be controlled; and temperature difference among the first fluid, the second fluid, and so on (namely, temperature difference among each of the supplied fluids to be processed) may be controlled either. To control temperature and temperature difference of each of the supplied fluids to be processed, a mechanism with which temperature of each of the fluids to be processed is measured (temperature of the fluid before introduction to the processing apparatus, or in more detail, just before introduction into between the processing surfaces 1 and 2) so that each of the fluids to be processed that is introduced into between the processing surfaces 1 and 2 may be heated or cooled may be installed.

The present invention is not limited to the case that at least two fluids comprising the fluid which contains at least one kind of material to be extracted and the extracting fluid which contains at least one kind of extraction solvent are used. The fluid which contains at least one kind of material to be extracted and the extracting fluid which contains at least one kind of extraction solvent may be mixed in advance, and then this mixed fluid may be introduced as one fluid into between the processing surfaces 1 and 2 thereby forming a thin film fluid (fluid film) for the extraction treatment.

Further in addition in the present invention, alternatively, the extraction treatment may be done as before and after the treatment such as mixing, diffusion, reaction, synthesis, and separation—these are different from this extraction treatment—in between the processing surfaces 1 and 2 which are disposed in a position they are faced with each other so as to be able to approach to and separate from each other, at least one of which rotates relative to the other. In this case, although not particularly restricted, for example, through each of the first to the third introduction parts (d1, d2, and d3), the fluid which contains at least one kind of material to be extracted as the first fluid, the fluid which contains at least one kind of material to be extracted that is different from the first fluid as the second fluid, and the extracting fluid which contains at least one kind of extraction solvent as the third fluid may be introduced separately into the processing apparatus thereby performing the treatment such as mixing, diffusion, reaction, synthesis, and separation by using the first fluid and the second fluid; and by introducing the extracting fluid into between the processing surfaces 1 and 2 as the third fluid, the treatment such as mixing, diffusion, reaction, synthesis, and separation may be carried out consistently with the extraction treatment or the separation and purification treatment in between the processing surfaces 1 and 2. The third fluid, which is the extracting fluid, can extract the intended product, which is the material to be extracted, from each of the fluids by mixing it with any one of the first fluid and the second fluid or both; or alternatively, by mixing it with a mixed fluid of the first fluid and the second fluid, the material to be extracted that is the intended product of the reaction with the material to be extracted in the unreacted state can be extracted. Practically, in accordance with the treatment such as reaction, synthesis, separation, and crystallization as well as the kind of the material to be extracted that is produced by the said treatment, the kind of the extraction solvent as well as the position at which the extracting fluid is introduced into between the processing surfaces 1 and 2 may be appropriately selected. Meanwhile, in this case, the first fluid and the second fluid each contains at least one kind of material to be extracted, the each material being different with each other; here, the materials to be extracted until just before the extraction may be in the unreacted state or in the reacted state of the material to be extracted in the unreacted state. In the present invention, the material to be extracted may be in any of the states until just before the extraction. In addition, in the present invention, the extraction solvent should be able to extract the material to be extracted regardless of the state of the material to be extracted during the extraction. During the time of extraction, the material to be extracted may be in the unreacted state, or in the post-reaction state which is the reacted state of the material to be extracted in the unreacted state, or in the mixed state of the both states. Practically, in accordance with the state of the intended material to be extracted, the extraction solvent may be appropriately selected.

During the time of carrying out a combination of reaction and extraction in between the processing surfaces 1 and 2 which are disposed in a position they are faced with each other so as to be able to approach to and separate from each other, at least one of which rotates relative to the other as mentioned above, for example, if, through each of the first to the third introduction parts (d1, d2, and d3), each of the fluid which contains at least one kind of material to be extracted as the first fluid, the fluid which contains at least one kind of material to be extracted that is different from the first fluid as the second fluid, and the extracting fluid which contains at least one kind of extraction solvent as the third fluid is introduced separately into the processing apparatus thereby mixing the first to the third fluids in between the processing surfaces 1 and 2, not only at least any one of the main product and the by-product formed by the reaction between the first fluid and the second fluid can be extracted as the material to be extracted into the extraction solvent which is contained in the third fluid, but also the reaction can be facilitated by extracting at least any one of the main product and the by-product into the extraction solvent as the material to be extracted; and thus, the reaction and the extraction can be carried out consistently.

In this embodiment, three fluids of the first to the third fluid are used; however, alternatively, the first to the third fluid may be mixed in advance to form one fluid, which may then be introduced into between the processing surfaces 1 and 2 to carry out the reaction and the extraction consistently. Further alternatively, the reaction and the extraction may be consistently carried out by introducing two fluids, the fluid which contains at least one kind of material to be extracted as the first fluid and the extracting fluid which contains at least one kind of extraction solvent as well as at least one kind of material to be extracted that is different from the first fluid as the second fluid, into between the processing surfaces 1 and 2.

The reaction that is carried out before and after the extraction treatment is not particularly restricted, while illustrative example thereof includes: an organic reaction and an inorganic reaction; a change of pH; an oxidation and a reduction reaction; a hydrolysis reaction; a polycondensation reaction; a reaction using a chelating agent; various reactions using a reversed micelle or a micelle; and a reaction to separate a material to be separated by mixing a solution in which the material to be separated is dissolved in a good solvent with a poor solvent which has lower solubility to this material to be separated than the good solvent.

As the specific embodiment, let's suppose the fluid processing method to carry out the esterification reaction, one of the organic reactions, and the extraction treatment in between the processing surfaces 1 and 2 which are disposed in a position they are faced with each other so as to be able to approach to and separate from each other, at least one of which rotates relative to the other. By using the apparatus shown in FIG. 4, through each of the first to the third introduction parts (d1, d2, and d3), each of the fluid which contains a carboxylic acid as the first fluid, the fluid which contains an alcohol as the second fluid, and the extracting fluid which contains the extraction solvent capable of extracting any one of the main product and the by-product as the third fluid is introduced separately into the processing apparatus whereby mixing these fluids in between the processing surfaces 1 and 2. By so doing, the first to the third fluids are mixed as a thinned film in between the processing surfaces 1 and 2, so that the esterification reaction to react the carboxylic acid with the alcohol as well as the extraction of the ester (main product) which is produced by the esterification reaction or water (by-product) into the extraction solvent can be carried out consistently. That is, the reaction can be facilitated by removing the main product or the by-product to outside the system by extraction thereof to the extraction solvent. In this embodiment, the material to be extracted is either the main product or the by-product; and the fluid which contains at least one kind of material to be extracted is the fluid which contains at least one component that constitutes at least one kind of material to be extracted, that is, the fluid which contains the at least one kind of material to be extracted in the unreacted state.

In the case that the extracting fluid which contains the extraction solvent that can extract both the main product and the by-product is used as the third fluid, and in the case that the extracting fluid which contains the extraction solvent that can selectively extract the main product and the extraction solvent that can selectively extract the by-product is used as the third fluid, the reaction and the extraction of the main product and the by-product produced by this reaction into the extraction solvents can be carried out consistently in between the processing surfaces 1 and 2.

When the method disclosed in the present invention is used, the treatment can be carried out consistently and readily without complicating the extraction method; and thus, the treatment amount can be increased with high yield (high extraction efficiency).

Hereinafter, the present invention will be explained in more detail by Examples; but the present invention is not limited only to these Examples.

Meanwhile, in the following EXAMPLES, the term "from the center" means "from the first introduction part d1" of the processing apparatus shown in FIG. 1 or FIG. 4; the first fluid means the first fluid to be processed which is introduced from the first introduction part d1; and the second fluid means the second fluid to be processed which is introduced from the second introduction part d2 of the processing apparatus shown in FIG. 1 or FIG. 4. The third fluid shall be the fluid to be processed which is introduced from the third introduction part d3 of the processing apparatus shown in FIG. 4.

EXAMPLE 1

While di(2-ethylhexyl) phosphate was introduced as the first fluid—the extracting fluid which contained the extraction solvent—from the center with the supply pressure of 0.30 MPaG, the back pressure of 0.02 MPaG, the rotation speed of 1700 rpm, the supply rate of 100 mL/minute, and the supply temperature of 40° C., a 1-N nitric acid solution of indium nitrate with the concentration thereof being 200 g/L as the metal, as the second fluid which contained the material to be extracted, was introduced into between the processing surfaces 1 and 2 with the supply rate of 20 mL/minute and the supply temperature of 40° C. so as to mix the first fluid and the second fluid in the thin film fluid. Each of the supply temperatures of the first fluid and the second fluid was measured just before introduction of the first fluid and the second fluid into the processing apparatus (in more detail, just before introduction into between the processing surfaces 1 and 2). By mixing the first fluid and the second fluid in the thin film fluid, the indium ion is migrated into the extraction solvent by extraction with the extraction solvent di(2-ethylhexyl) phosphate. The mixed solution of the first fluid, into which the indium ion was migrated, and the second fluid was discharged from between the processing surfaces 1 and 2. The discharged mixed solution of the first fluid, into which the indium ion was migrated, and the second fluid was settled, and then the resulting phases were separated by difference in specific gravities between the solvents

COMPARATIVE EXAMPLE 1

Extraction operation of COMPARATIVE EXAMPLE 1 was carried out by using a separation funnel wherein 50 mL of di(2-ethylhexyl) phosphate and 10 mL of a nitric acid solution of indium nitrate with the concentration thereof being 200 g/L as the metal were used. Specifically, 50 mL of di(2-ethylhexyl) phosphate with the temperature thereof being 40° C. and 10 mL of the 1-N nitric acid solution of indium nitrate with the concentration thereof being 200 g/L as the metal and with the temperature thereof being 40° C. were taken into the separation funnel; and then, the funnel was shaken for 3 minutes to extract the indium ion into 50 mL of di(2-ethylhexyl) phosphate. Thereafter, the mixed solution of the both fluids in the separation funnel was settled, and then, the resulting phases were separated by difference in specific gravities between the solvents.

EXAMPLE 2

While di(2-ethylhexyl) phosphate was introduced as the first fluid—the extracting fluid which contained the extraction solvent—from the center with the supply pressure of 0.30 MPaG, the back pressure of 0.02 MPaG, the rotation speed of 1700 rpm, the supply rate of 100 mL/minute, and the supply temperature of 40° C., a 1-N nitric acid solution of indium nitrate with the concentration thereof being 200 g/L as the metal, as the second fluid which contained the material to be extracted, was introduced with the supply rate of 20 mL/minute and the supply temperature of 40° C. as well as an aqueous 1-N sodium hydroxide, as the third fluid, with the supply rate of 5 mL/minute and the supply temperature of 40° C. into between the processing surfaces 1 and 2 so as to mix the first to the third fluids in the thin film fluid. Each of the supply temperatures of the first to the third fluid was measured just before introduction of the first to the third fluid into the processing apparatus (in more detail, just before introduction into between the processing surfaces 1 and 2). By mixing the first to the third fluids in the thin film fluid, the indium ion is migrated into the extraction solvent by extraction with the extraction solvent di(2-ethylhexyl) phosphate. The mixed solution of the first fluid, into which the indium ion was migrated, the second fluid, and the third fluid was discharged from between the processing surfaces 1 and 2. The discharged mixed solution of the first fluid, into which the indium ion was migrated, the second fluid, and the third fluid was settled, and then the resulting phases were separated by difference in specific gravities between the solvents. Meanwhile, the aqueous 1-N sodium hydroxide was introduced as the third fluid into between the processing surfaces 1 and 2 from the start of this treatment.

EXAMPLE 1

While di(2-ethylhexyl) phosphate was introduced as the first fluid—the extracting fluid which contained the extraction solvent—from the center with the supply pressure of 0.30 MPaG, the back pressure of 0.02 MPaG, the rotation speed of 1700 rpm, the supply rate of 150 mL/minute, and the supply temperature of 40° C., a 1-N nitric acid solution of indium nitrate with the concentration thereof being 200 g/L as the metal, as the second fluid which contained the material to be extracted, was introduced into between the processing surfaces 1 and 2 with the supply rate of 50 mL/minute and the supply temperature of 40° C. so as to mix the first fluid and the second fluid in the thin film fluid. Each of the supply temperatures of the first fluid and the second fluid was measured just before introduction of the first fluid and the second fluid into the processing apparatus (in more detail, just before introduction into between the processing surfaces 1 and 2). By mixing the first fluid and the second fluid in the thin film fluid, the indium ion is migrated into the extraction solvent by extraction with the extraction solvent di(2-ethylhexyl) phosphate. The mixed solution of the first fluid, into which the indium ion was migrated, and the second fluid was discharged from between the processing surfaces 1 and 2. The mixed solution of the first fluid, into which the indium ion was migrated, and the second fluid was settled, and then the resulting phases were separated by difference in specific gravities between the solvents.

EXAMPLE 4

While a 1-N nitric acid solution of indium nitrate with the concentration thereof being 200 g/L as the metal was introduced from the center as the first fluid which contained the material to be processed with the supply pressure of 0.30 MPaG, the back pressure of 0.02 MPaG, the rotation speed of 1700 rpm, the supply rate of 50 mL/minute, and the supply temperature of 40° C., di(2-ethylhexyl) phosphate was introduced as the second fluid—the extracting fluid which contained the extraction solvent—with the supply rate of 100 mL/minute and the supply temperature of 40° C. into between the processing surfaces 1 and 2 so as to mix the first fluid and the second fluid in the thin film fluid. Each of the supply temperatures of the first fluid and the second fluid was measured just before introduction of the first fluid and the second fluid into the processing apparatus (in more detail, just before introduction into between the processing surfaces 1 and 2). By mixing the first fluid and the second fluid in the thin film fluid, the indium ion is migrated into the extraction solvent by extraction with the extraction solvent di(2-ethylhexyl) phosphate. The mixed solution of the first fluid, into which the indium ion was migrated, and the second fluid was discharged from between the processing surfaces 1 and 2. The mixed solution of the first fluid, into which the indium ion was migrated, and the second fluid was settled, and then the resulting phases were separated by difference in specific gravities between the solvents.

The indium concentration in the aqueous phase in each of EXAMPLES 1 to 4 and COMPARATIVE EXAMPLE 1 was measured by using an ICP emission spectrometric analysis. For the ICP emission spectrometric analysis, ICPS-8100 (sequential type, manufactured by Shimadzu Corp.) was used. The aqueous phase in EXAMPLES 1 to 4 and COMPARATIVE EXAMPLE 1 means, of the two phases separated by settling the mixed solution after the extraction treatment, the solution which contains the 1-N nitric acid solution of indium nitrate after migration of the indium ion into di(2-ethylhexyl) phosphate by extraction.

The yield (extraction efficiency) was calculated from the indium concentration of indium nitrate in the 1-N nitric acid solution before the extraction (200 g/L as the metal concentration) and the indium concentration in the aqueous phase after the extraction as shown in Table 1.

Each indium concentration and the indium yield in the aqueous phase based on the result by the ICP measurement is shown in Table 1. Meanwhile, each of data in EXAMPLES 1 to 4 and COMPARATIVE EXAMPLE 1 shown in Table 1 is the average value of 5 experiments (n=5) of each EXAMPLES 1 to 4 and COMPARATIVE EXAMPLE 1.

TABLE 1

| | In concentration in aqueous phase [g/L] | Yield [%] |
| --- | --- | --- |
| EXAMPLE 1 | 16.89 | 91.56 |
| EXAMPLE 2 | 0.04 | 99.98 |
| EXAMPLE 3 | 17.65 | 91.18 |
| EXAMPLE 4 | 16.75 | 91.63 |
| COMPARATIVE EXAMPLE 1 | 55.62 | 72.19 |

In EXAMPLES 1 to 4, the yield of the indium ion (extraction efficiency) was higher as compared with COMPARATIVE EXAMPLE 1 which used the separating funnel. In comparison between EXAMPLE 1 and EXAMPLE 2, the yield (extraction efficiency) was further improved in EXAMPLE 2 in which the alkali, one of the basic substances, was added into the thin film fluid.

When the extraction treatment by using di(2-ethylhexyl) phosphate was done as to 5 liters of the 1-N nitric acid solution of indium nitrate with the concentration thereof being 200 g/L as the metal by using the 1-L separating funnel, 40 batches of the extraction treatment were necessary to treat 750 mL for every one batch according to the ratio shown in COMPARATIVE EXAMPLE 1, and in addition it took the time of about 600 to 700 minutes; on the other hand, the treatment could be done in about 250 minutes in the method of EXAMPLE 1. When compared with the case of using the separation funnel, the treatment time could be shortened by more than ½. In addition, variation in the yield (extraction efficiency) was not observed in EXAMPLES 1 to 4, while the yield (extraction efficiency) in COMPARATIVE EXAMPLE 1 was in the range of 65 to 80%; and thus, variation in the yield was observed.

From the above results, it could be confirmed that the material to be extracted could be consistently extracted with high efficiency and high yield by using the fluid processing method including extraction according to the present invention.

In addition, it was confirmed from EXAMPLE 1 and EXAMPLE 3 that the extraction capacity can be increased by controlling and optimizing the supply rate of the extracting fluid which contains the extraction solvent and the supply rate of the fluid which contains the material to be extracted.

1 first processing surface
2 second processing surface
10 first processing member
11 first holder
20 second processing member
21 second holder
d1 first introduction part
d2 second introduction part
d3 third introduction part
d20 opening
d30 opening

The invention claimed is:

1. A fluid processing method, comprising:
preparing at least two fluids to be processed, the at least two fluids including:
 a first fluid, being one of a fluid containing at least one kind of a material to be extracted and an extracting fluid containing at least one kind of extraction solvent that is capable of extracting said material to be extracted; and
 a second fluid, being the other of the fluid containing the at least one kind of the material to be extracted and the extracting fluid containing the at least one kind of extraction solvent that is capable of extracting said material to be extracted;
introducing the at least two fluids into a processing device, the processing device comprising:
 at least two processing surfaces facing each other, at least one of the at least two processing surfaces rotating relative to the other about a rotating shaft, the at least two processing surfaces being capable of approaching to and separating from each other in an axial direction of the rotating shaft;
maintaining a space between the at least two processing surfaces by a balance between a force that moves the at least two processing surfaces in a separating direction and a force that moves the at least two processing surfaces in an approaching direction,
wherein the processing device includes:
 a first flow path for introducing the first fluid into the space between the at least two processing surfaces; and
 a second flow path, independent of the first flow path, for introducing the second fluid, the second flow path leading to at least one opening formed on at least one of the at least two processing surfaces, the second fluid being introduced into the space between the at least two processing surfaces through the at least one opening, and
wherein the first fluid is introduced into the space between the at least two processing surfaces through the first flow path, forming a thin film fluid; and the second fluid is introduced into the thin film fluid of a laminar flow formed by the first fluid through the at least one opening;
mixing the first fluid and the second fluid under the condition of the laminar flow as a thinned film;
extracting the material to be extracted into the extraction solvent;
discharging a mixed solution of the first fluid and the second fluid from the space between the at least two processing surfaces;
settling the mixed solution of the first fluid and the second fluid discharged from the space between the at least two processing surfaces; and
separating an intended product, in which the material to be extracted are extracted into the extraction solvent, by difference in specific gravities between solvents.

2. The fluid processing method according to claim 1, wherein the material to be extracted is a metal ion, and the method further comprises the step of carrying out the extraction in a certain pH region to lower a decrease of partition coefficient.

3. The fluid processing method according to claim 1, further comprising:
mixing and reacting the first fluid and the second fluid under the condition of a laminar flow in the thin film fluid.

4. The fluid processing method according to claim 3, further comprising the step of preparing a third fluid containing at least one kind of material to be extracted that is different from the first fluid,
wherein:
one of the first fluid and the third fluid is a fluid containing carboxylic acid, the other of the first fluid and the third fluid is a fluid containing an alcohol,
the extraction solvent is capable of extracting the material to be extracted in the post-reaction state,
the processing apparatus is provided with a third flow path, independent of the first flow path, for introducing the third fluid, the third flow path leading to at least one opening provided on at least one of the at least two processing surfaces,
the method further comprises introducing the third fluid into the space between the at least two processing surfaces through the at least one opening to which the third flow path leads into the thin film fluid of a laminar flow formed by the first fluid, when a center side of the at least two processing surfaces is defined to be an upstream side and an outer side of the at least two processing surfaces is defined to be a downstream side, the at least one opening to which the third flow path leads is arranged at the upstream side than the at least one opening to which the second flow path leads, and the first fluid, the second fluid and the third flow are mixed under the condition of a laminar flow and esterification reaction thereof is carried out, thereby extracting ester or water produced by the esterification reaction into the extraction solvent.

5. A fluid processing method, comprising:
preparing at least three fluids to be processed, the at least three fluids including:
    a first fluid;
    a second fluid, at least one of the first fluid and the second fluid containing at least one starting material for a material to be extracted; and
    a third fluid, being an extracting fluid containing at least one kind of extraction solvent capable of extracting the material to be extracted;
introducing the at least three fluids into a processing device, the processing device comprising:
    at least two processing surfaces facing each other, at least one of the at least two processing surfaces rotating relative to the other about a rotating shaft, the at least two processing surfaces being capable of approaching to and separating from each other in an axial direction of the rotating shaft;
maintaining a space between the at least two processing surfaces by a balance between a force that moves the at least two processing surfaces in a separating direction and a force that moves the at least two processing surfaces in an approaching direction,
wherein the processing device includes:
    a first flow path for introducing any one of the at least three fluids into the space between the at least two processing surfaces; and
    second and third flow paths, independent of the first flow path, for introducing remaining fluids, the second and third flow path each leading to at least one opening formed on at least one of the at least two processing surfaces, said remaining fluids being introduced into the space between the at least two processing surfaces through the at least one opening, and wherein said any one of the at least three fluids that is introduced into the space between the at least two processing surfaces through the first flow path forms a thin film fluid; and the remaining fluids are introduced into the thin film fluid of a laminar flow through the at least one opening;

mixing and reacting the at least three fluids under the condition of the laminar flow as a thinned film; and extracting the material to be extracted into the extraction solvent, the extracted material being a reaction product and a by-product;

discharging a mixed solution of the first fluid, the second fluid and the third fluid from the space between the at least two processing surfaces;

settling the mixed solution of the first fluid, the second fluid and the third fluid discharged from the space between the at least two processing surfaces; and separating an intended product, in which the material to be extracted are extracted into the extraction solvent, by difference in specific gravities between solvents.

6. The fluid processing method according to claim 5, wherein:
one of the first fluid and the second fluid is a fluid containing a first starting material, and said first starting material is a carboxylic acid,
the other of the first fluid and the second fluid is a fluid containing a second starting material, and said second starting material is an alcohol,
the at least three fluids are mixed under the condition of a laminar flow in the thin film fluid and esterification reaction of the at least three fluids are carried out, and
both ester and water produced by the esterification reaction are extracted into the extraction solvent.

* * * * *